Oct. 29, 1968  J. G. SHAW  3,407,602
TRANSMISSION APPARATUS
Filed Feb. 13, 1967  4 Sheets-Sheet 1

INVENTOR
JOHN G. SHAW
BY
Fetherstonhaugh & Co.
ATTORNEYS

Oct. 29, 1968  J. G. SHAW  3,407,602

TRANSMISSION APPARATUS

Filed Feb. 13, 1967  4 Sheets-Sheet 2

INVENTOR
JOHN G. SHAW
BY
Featherstonhaugh & Co.
ATTORNEYS

Oct. 29, 1968   J. G. SHAW   3,407,602
TRANSMISSION APPARATUS
Filed Feb. 13, 1967   4 Sheets-Sheet 3
A
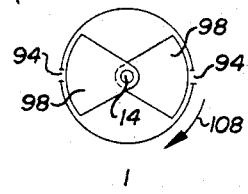 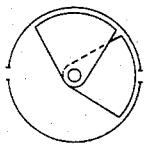 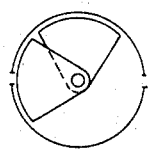 
   1        2        3        4
B
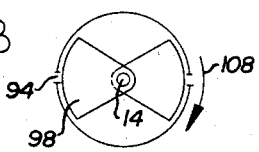 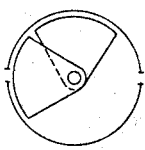 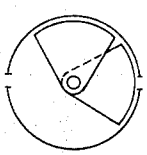 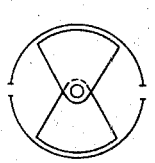
*Fig. 9.*
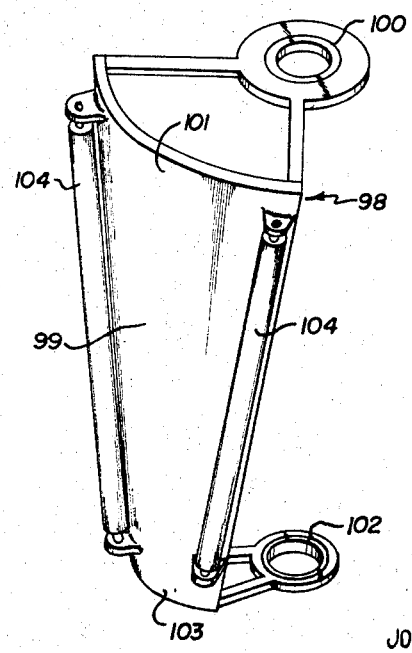
*Fig. 8.*
INVENTOR
JOHN G. SHAW
BY
*Fetherstonhaugh & Co.*
ATTORNEYS

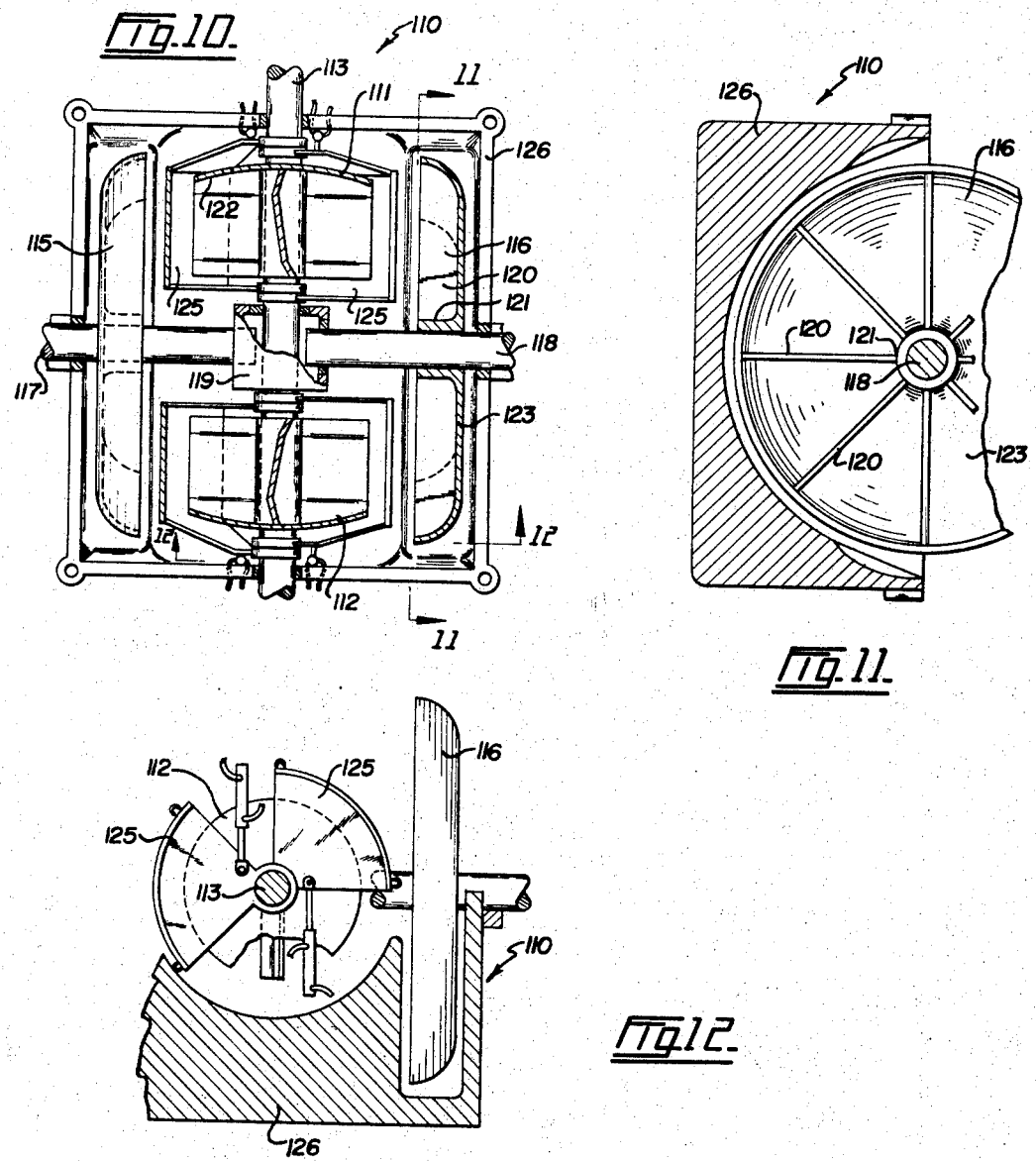

United States Patent Office 3,407,602
Patented Oct. 29, 1968

3,407,602
TRANSMISSION APPARATUS
John G. Shaw, 1531 Dansey Ave., Coquitlam,
New Westminster, British Columbia, Canada
Filed Feb. 13, 1967, Ser. No. 615,835
11 Claims. (Cl. 60—102)

ABSTRACT OF THE DISCLOSURE

Transmission apparatus for an engine driven vehicle having left and right traction elements, said transmission apparatus having a pair of longitudinally spaced apart coaxial centrifugal flow propellers connected for mutual rotation and in direct driven engagement with the engine for delivering hydraulic fluid to a pair of independently rotatable turbines, the latter being connected to the traction elements. Shields are employed to selectively control the flow of fluid from the propellers to the turbines.

Background of the invention

This invention relates to apparatus for transmitting the torque produced by a vehicle engine to the driving elements of the vehicle, and relates particularly to automotive type vehicles wherein the driving elements are right and left driving wheels.

In conventional automotive vehicles the torque provided by the engine is transferred to the driving wheels through a transmission which may be automatically or manually operated, then through a differential which permits differential rotation of the driving wheels. Both the transmission and differential normally employ intermeshing gears to effect the transmission of power, consequently, the metal to metal contact of these gears results in friction and consequent wear of moving parts.

Summary of the invention

The present invention provides gearless transmission which also serves as a differential and which is purely hydraulic in operation thereby eliminating the metal to metal contact of the ratioed gears in transmission and in the direct gear drive of the differentials. Wear of operating parts is thereby eliminated. Furthermore, the transmission of the present invention permits the torque delivered by the engine to be utilized as a brake when the vehicle is moving in any direction.

To attain these ends, the present invention employs a pair of mutually rotatable impellers connected in direct driven engagement with the engine of the vehicle, each of which is arranged to deliver hydraulic fluid into opposite vanes of each one of a pair of turbines. The flow of fluid to the blades of the turbines is controlled by shields which may be selectively interposed between the impellers and the turbines to permit the fluid to impinge on one or the other or both of the opposite vanes, thereby controlling the direction of rotation of the turbines. The turbines are connected in driving engagement with the wheels of the vehicle.

Brief description of the drawings

FIGURE 4 is an enlarged isometric view of an impeller of the embodiment illustrated in FIGURE 2, FIGURE 5 is an isometric view of a portion of the casing of said embodiment, FIGURE 6 is a view taken along line 6—6 of FIGURE 5, FIGURE 7 is an isometric view of a sleeve bearing of said one embodiment, FIGURE 8 is an isometric view of a shield of said one embodiment, FIGURE 9 is a diagrammatic representation of the embodiment as illustrated in the foregoing figures with the shields placed in varied positions to illustrate the operation of this embodiment, FIGURE 10 is a plan view of another embodiment of the invention with certain portions partially removed and other portions shown partially in section, FIGURE 11 is a view taken along line 11—11 of FIGURE 10, and FIGURE 12 is a view taken along line 12—12 of FIGURE 10.

Description of the preferred embodiments

Figure 1:
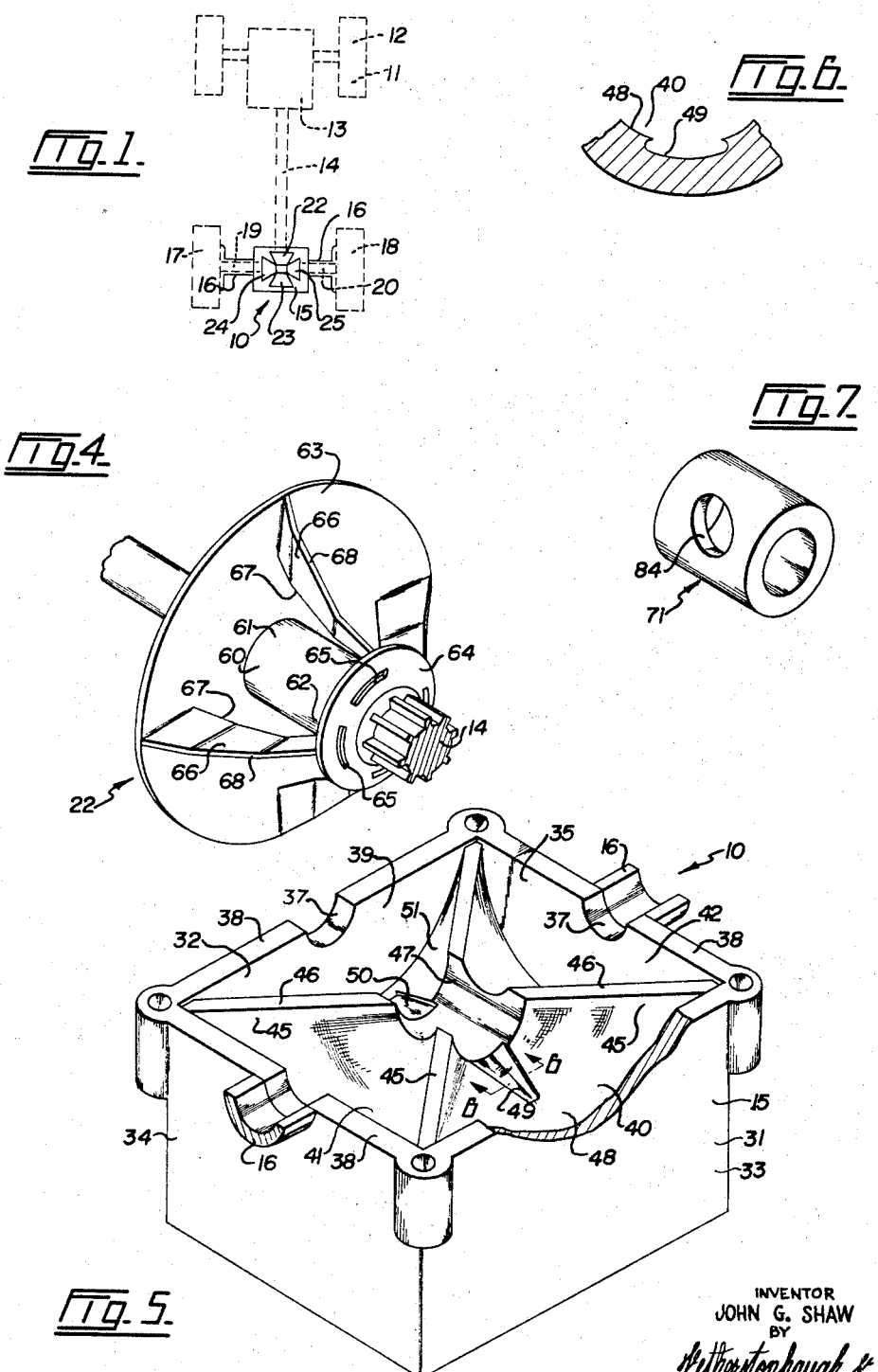
FIGURE 1 is a diagrammatic representation of an engine driven motor vehicle and the transmission apparatus incorporated therein.
Figure 2:
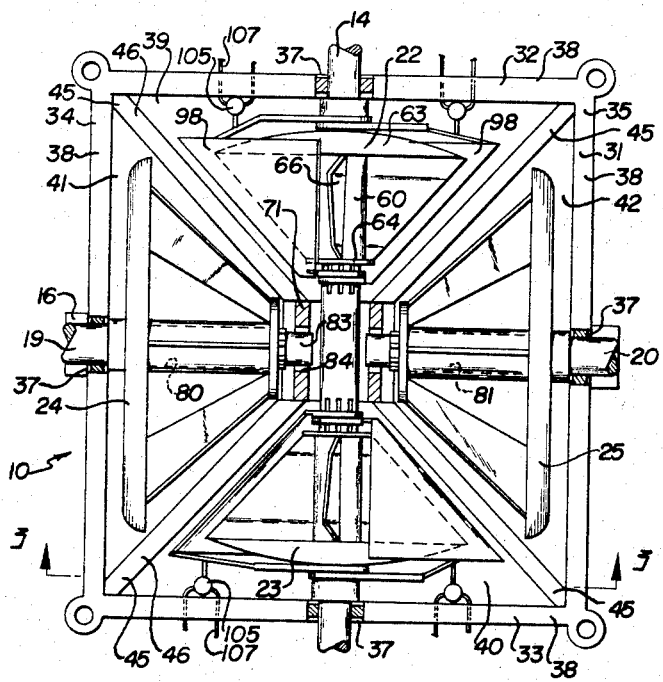
FIGURE 2 is a plan view of one embodiment of the invention, including a casing which is partially removed for purposes of illustration.
Figure 3:
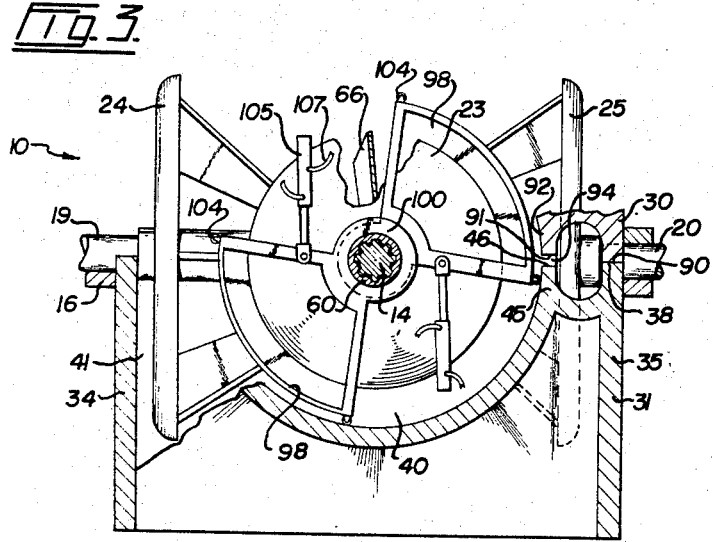
FIGURE 3 is a sectional view of the embodiment illustrated in FIGURE 2 taken along line 3—3 thereof.

FIGURES 1 to 9 illustrate one embodiment 10 of the apparatus, FIGURE 1, illustrating diagrammatically, its employment in an automobile 11, the latter also being shown diagrammatically. The automobile 11 has front wheels 12, an engine 13 and a drive shaft 14 which extends rearwardly into a casing 15 in which the transmission apparatus 10 is housed, said casing 15 forming part of an axle housing 16 on which the rear wheels 17 and 18 are rotatably mounted. The rear wheels are connected to axles 19 and 20 respectively which extend through the housing into the casing 15. The transmission apparatus 10 comprises a pair of centrifugal flow impellers mounted in tandem on the drive shaft 14 for mutual rotation in the casing 15, there being a front impeller 22 and a rear impeller 23. These impellers when driven by the drive shaft 14 are arranged to deliver a hydraulic fluid, with which the casing 15 is filled, into the blades of a left turbine 24 and a right turbine 25, the left turbine 24 being connected to axle 19 and the right turbine 25 to axle 20. These turbines are positioned to receive the flow of fluid from each of the impellers 22 and 23, said flow being directed by means hereinafter to be described into the blades of the turbines to drive the latter, independently of each other, in any selected direction.

The casing 15 is preferably formed as a pair of identical but counterposed halves 30 and 31, 30 being the upper half and 31 being the lower half. As each of the halves are identical and counterposed, only one, the lower half 31 (FIGURE 5), will be described in detail.

Referring to FIGURE 5, lower half 31 is somewhat rectangular in shape having front and rear walls 32 and 33 respectively and left and right side walls 34 and 35 respectively, said walls having semi-circular grooves 37 formed centrally in their upper edges 38.

The interior of said lower half 31 is divided into four pockets of frustoconical shape, a front pocket 39, rear pocket 40 and left and right side pockets 41 and 42 respectively. The pockets are so arranged so that their axes lie in a common plane and intersect at a common point being the central point of the casing. Common diagonal interior walls 45 separate adjacent pockets, the upper edges 46 of these walls 45 lying slightly below the upper edges 38 of the walls 32 to 35. The walls 45 terminate short of each other to provide a central well 47.

Formed in an inner surface 48 of pocket 40 and centrally thereof, is a C-shaped groove 49 as illustrated in FIGURES 5 and 6 which opens into the central well 47 and tapers gradually towards the rear wall 33 of the casing. A similar groove 50 is formed in the inner surface 51 of pocket 39.

The impellers 22 and 23 are of identical construction, forward impeller 22 being illustrated isometrically in FIGURE 4. Impeller 22 is formed having a central elongated internally splined sleeve 60 at one end 61 of which a large diameter annular plate 63 is non-rotatably secured as by welding or the like, and at the other end 62 a small diameter annular plate 64 is also secured non-rotatably thereto as by welding or the like, plate 64 being provided with arcuate slots 65. Blades 66 extend between and are secured rigidly as by welding to plates 63 and 64, said blades having their inner edges 67 clear of the sleeve 60. The outer edges 68 of these blades 66 extend to the periphery of each of the plates 63 and 64, and therefore the entire impeller has a frustoconical appearance. Both impellers are non-rotatably mounted on the drive belt shaft 14, the latter being suitably splined for this purpose, plates 64 of each of said impellers being spaced apart by, and rotatably bearing against a sleeve bearing 71 illustrated in FIGURE 7. The length of said sleeve bearing 71 is such that forward impeller 22 will spacedly fit the front pocket 39, whereas rear impeller 23 will fit itself in pocket 40, the relative size of the impellers relative to their associated pockets being such that the outer edges 68 of the blades 66 are clear of the inner surfaces of said pockets. The blades of both impellers, it will be observed, do not extend in the straight line between plates 63 and 64, but are so shaped that the advance surface of each is concave.

The turbines 24 and 25 which are identical in construction to the impellers 22 and 23, are mounted in left pocket 41 and in right pocket 42 respectively on suitably splined end portions 80 and 81 of axles 19 and 20 respectively. Axle 19 is rotatably supported in the groove 37 of left wall 34 and is rotatably journalled at its end 83 in a socket 84 formed in said sleeve bearing 71, while axle 20 is rotatably supported in the groove 37 of wall 35 and said sleeve bearing 71. The drive shaft 14 rotatably seats itself in the grooves 37 of the front and rear walls 32 and 33 of the casing.

The upper half 30 of the casing is identical to the lower half 31 having pockets, not shown, which complement the pockets of the lower half, thereby forming corresponding chambers in which the impellers and turbines rotate. The upper and lower halves of the casing are so constructed that the upper edges 38 of the walls of said lower half meet the corresponding lower edges 90 of the corresponding walls of the upper half so as to space the upper edges 46 of the diagonally extending walls 45 apart from the lower edges 91 of the corresponding diagonal walls 92 of the upper half of the casing, thereby forming elongated openings 94, one of which is partially illustrated in FIGURE 3.

Rotatably secured in pairs for rotation about each of the impellers 22 and 23, are shields 98 movable between the impellers and the inner surfaces of the pockets of casing 10. FIGURE 8 illustrates one of the shields, the latter having a shielding portion 99 of relatively thick metal formed to conform to the frustoconical shape of the impeller to which it lies adjacent and having a bearing 100 at one end 101 which rotatably encircles the drive shaft 14 adjacent front wall 32 and having a similar bearing 102 at its other end 103 which is rotatably journalled to the sleeve bearing 71. The shielding portions 99 is provided with rollers 104 at its edges so as to provide rolling friction with the casing should the shield for any reason deform under pressure.

Each of the shields 98 is independently movable relative to the other shields. It is preferred to employ small hydraulically operated piston and cylinder assemblies 105 connected between each shield and the casing. Each of these piston and cylinder assemblies 105 are connected as by hydraulic conduits 107 which pass through the casing to a suitable source of pressurized hydraulic fluid, not shown, from which the flow of fluid is controlled by conventional valves, not shown, which may be manually or automatically operated. It will be apparent that the valves might be manipulated by cables or other suitable means, consequently, it is to be understood that the invention is not to be limited to any one means.

The casing 15 is filled with a suitable hydraulic fluid so that upon rotation of the impellers 22 and 23, the fluid will pass through the openings 94 and impinge upon the blades of the turbines. If the openings 94, which are all of the same size are clear, equal volumes of hydraulic fluid will pass through the openings 94 on either side of impellers 22 and 23 to impinge upon diametrically opposed blades of each of the turbines. The fluid delivered by one impeller will therefore act in opposition to the fluid delivered by the other impeller, thereby resulting in the transmission of zero torque to the turbines.

The shields, however, may be positioned by operation of the piston and cylinder assemblies 105 to close or partially close any of the openings so as to control the amount of fluid passing therethrough. It will be seen, therefore, that if any diagonally opposed pair of openings 94 were closed by proper positioning of the shields and the other diagonally opposed pair of openings 94 were left open, the turbines would both rotate in the same direction. Reversal of the positions of the shield would naturally result in reversal of the direction of rotation of the turbines.

In FIGURE 9 there is illustrated varied positions which may be assumed by the shields 98, viewed back to front, to effect varied operation of the automobile. The upper row of diagrammatic representations. A is a representation of the forward impeller 22 and the shields associated therewith, and the lower row accorded the numeral B being the rear impeller 23 and the shields associated therewith. In this figure the openings 94 are illustrated diagrammatically, and the direction of rotation of the drive shaft 14 indicated by the arrows 108. In position 1 the shields 94 are positioned across all of the openings to stop any flow of oil from the impellers reaching the turbines. With the shields in this position, no power is transmitted to the turbines even though the impellers may be rotating. The automobile will therefore remain stationary. In position 2, the shields have been positioned so that the fluid passes from impeller 22 to turbines 24 and from impeller 23 to turbine 25, thereby driving the turbines and with them the left and right rear wheels of the automobile in a reverse direction. In position 3, the shields have been positioned so that the flow of fluid from the impeller 22 now passes into the blades of right turbine 25, while the fluid from the impeller 23 passes into the blades of turbine 24, thereby rotating both turbines in the same forward direction.

In position 4, the shields 98 have been positioned clear of all openings so that all openings may pass an equal volume of hydraulic fluid so that the net torque on the turbines is zero.

It will be appreciated that the shields 98 may be positioned in varied positions between the positions previously described. For instance, if in position 3 the shields were positioned so that only a partial rather than a full flow of hydraulic fluid were to pass from the impellers to the turbines for forward drive, only a portion of the torque would be transmitted to the driving wheels of the automobile. The automobile therefore may be operated very slowly regardless of the speed with which the impellers are driven. This will permit the automobiles to be driven safely in heavy traffic or the like. It will also be appreciated that if, when the automobile is moving forwardly it is desired to retard its forward motion, the shields may be moved to a position No. 1 or a variation thereof to permit the torque delivered by the automobile engine to oppose the rotation of the turbines, thereby eliminating the employment of friction type brakes for this purpose.

During the operation of the transmission apparatus the fluid will circulate through the opening 94 into the blades of the turbines, thence inwardly on to the central well 47, thence outwardly through the grooves 49 into the blades of the impellers. The flow of fluid will therefore be turbulent free resulting in a smoother transfer of torque from the impellers to the turbines.

FIGURES 10 to 12 illustrate another embodiment 110 of the transmission apparatus.

Transmission 110 operates in exactly the same manner as transmission 10, and differs therefrom only in shape. Transmission 110 has cylindrically shaped impellers 111 and 112 respectively, which are both mounted on drive shaft 113 for mutual rotation. Turbines 115 and 116 are mounted opposite each other on either side of the impellers on axles 117 and 118 respectively, the latter being rotatably journalled in a sleeve bearing 119 rotatably mounted on the shaft between said impellers 111 and 112. These turbines are identical and with reference to turbine 116 it will be seen that the blades 120 thereof extend radially outwardly having inner end edges 121 extending parallel to the outer edges 122 of the blades of the impellers. These blades 120 being secured to a dish-shaped plate 123 which is non-rotatably secured on axle 118 by suitable means, such as by welding or, if preferred, by a splined connection. Apparatus 110 is also provided with shields 125 which are cylindrical in shape to conform to the shape of the impellers 111, said impellers and turbines of apparatus 110 being enclosed in a casing 126 which is shaped to conform to the shape of the last mentioned impellers and turbines in the same manner as casing 15 corresponds to the shape of impellers 22 and 23 and turbines 24 and 25.

I claim:

1. Transmission apparatus for engine driven vehicles having left and right traction members comprising a casing adapted to hold hydraulic fluid, a drive shaft extending into the casing and being connected in driven engagement with the engine of the vehicles, a pair of centrifugal flow impellers having radially extending blades mounted in tandem on the shaft for rotation therewith within the casing, a pair of left and right turbines mounted in the casing for rotation independently of each other about axes which extend normal to the axis of rotation of the drive shaft and which intersect the last-mentioned axis between the impellers so that the fluid from each impeller will impinge upon diametrically opposite blades of each turbine, shields movably mounted in the casing, said shields being independently and selectively interposable between each of the impellers and turbines for selectively controlling the flow of hydraulic fluid therebetween so as to control the direction of rotation of the turbines, means for controlling the movements of the shields, and means for connecting the turbines in driving engagement with the traction elements.

2. Transmission apparatus as claimed in claim 1 wherein the casing is formed to follow the contours of the impellers, said casing having opposed interior upper and lower wall sections extending between the impellers and turbines, the wall sections of each pair being spaced apart so as to form an opening therebetween for the passage of hydraulic fluid from each impeller into the blades of the adjacent turbines.

3. Transmission apparatus as claimed in claim 2 in which the shields are shaped to follow the contours of the impellers, said shields being mounted for rotation about the impellers.

4. Transmission apparatus as claimed in claim 3 including rollers mounted on the shields for providing rolling support of the latter against the wall of the casing.

5. Transmission apparatus as claimed in claim 1 in which the impellers and turbines are frusto-conical in shape tapering inwardly towards each other.

6. Transmission apparatus as claimed in claim 1 in which the impellers are cylindrical in shape.

7. Transmission apparatus as claimed in claim 1 in which the shields are mounted in pairs at each turbine.

8. Transmission apparatus as claimed in claim 1 in which the blades of the impellers extend radially outwardly from the axis of rotation of the drive shaft, said blades having advance concave surfaces.

9. Transmission apparatus comprising a casing arranged to hold a hydraulic fluid, a pair of coaxially aligned axially spaced apart centrifugal flow impellers mounted for mutual rotation in the casing and immersed in the hydraulic fluid, a drive shaft connected to the impellers for rotating the latter, a pair of coaxially aligned turbines mounted opposite each other in the casing for independent relative rotation, the axes of said turbines extending transversely to and in convergent relationship with the axes of the impellers, intermediately between the latter, each turbine having blades arranged for impingement thereon of the fluid delivered by both impellers, a shaft connected in driven engagement with each turbine, and shield means selectively interposable between either of the impellers and the turbines for obstructing the flow of fluid therebetween.

10. Transmission apparatus comprising a casing arranged to hold a hydraulic fluid, a pair of coaxially aligned axially spaced apart centrifugal flow impellers mounted for mutual rotation in the casing and immersed in the hydraulic fluid, a drive shaft connected to the impellers for rotating the latter, a pair of coaxially aligned turbines mounted opposite each other in the casing for independent relative rotation, the axes of said turbines extending transversely to and in convergent relationship with the axes of the impellers, intermediately between the latter, each turbine having blades extending adjacent to both impellers, means for directing the fluid from the impeller to impinge upon the turbine blades, a shaft connected in lower engagement with each turbine, and shield means selectively interposable between either of the impellers and the turbines for obstructing the flow of fluid therebetween.

11. Transmission apparatus as claimed in claim 10 in which said means comprises the walls of the casing, said walls being formed so as to fittedly encase each impeller and having openings formed therein between each impeller and the turbine adjacent to permit the passage of fluid therebetween.

References Cited

UNITED STATES PATENTS 2,827,802  3/1958  Burke _____ 74—650 XR

MARTIN P. SCHWADRON, *Primary Examiner.*

R. R. BUNEVICH, *Assistant Examiner.*